United States Patent [19]
Paterson

[11] Patent Number: 5,050,168
[45] Date of Patent: Sep. 17, 1991

[54] TEST COVERAGE ANALYZER

[76] Inventor: Timothy L. Paterson, 13416 SE. 187th Pl., Renton, Wash. 98058

[21] Appl. No.: 458,789

[22] Filed: Dec. 29, 1989

[51] Int. Cl.[5] ............................................. G06F 11/00
[52] U.S. Cl. ..................................... 371/19; 364/200; 364/267.91
[58] Field of Search ................... 371/19; 364/200, 900

[56] References Cited

U.S. PATENT DOCUMENTS

| | | | |
|---|---|---|---|
| 4,635,193 | 1/1987 | Moyer | 371/19 X |
| 4,853,851 | 8/1989 | Horsch | 364/300 |
| 4,866,665 | 9/1989 | Haswell-Smith | 371/19 X |
| 4,910,663 | 3/1990 | Bailey | 364/200 |

OTHER PUBLICATIONS

"Testing Techniques Newsletter", vol. 12, No. 2, Winter 1989/90, Software Research, Inc. (4 pages).
"SR Product Summary", Software Research, Inc. (4 pages).
Product Information (2 pages), TCAT/C: Test Coverage Analysis Tool for 'C', Software Research, Inc.

*Primary Examiner*—Robert W. Beausoliel
*Attorney, Agent, or Firm*—Christensen, O'Connor, Johnson & Kindness

[57] ABSTRACT

A test coverage analyzer (computer program) for monitoring the execution of a target program to determine which target program instructions have been executed. The analyzer first executes a portion of the target program in step mode, in which target program instruction are executed one at a time. In step mode, the analyzer maintains data indicating which target program instructions have been executed. When a branch is encountered, the analyzer inserts breakpoints in the target program at the first instructions of the branches that are not taken. When the analyzer determines that the target program instruction being executed has already been executed, it switches to run mode, so that the target program begins executing at its normal running speed. This continues until one of the inserted breakpoints is encountered, at which point the analyzer removes the breakpoint and switches back to step mode.

19 Claims, 4 Drawing Sheets

RANGE TABLE

| START OF RANGE | END OF RANGE |
|---|---|
| — | — |
| — | — |

Fig. 5.

BREAKPOINT TABLE

| ORIGINAL INSTRUCTION | ADDRESS OF INSTRUCTION | FLAG |
|---|---|---|
| — | — | — |
| — | — | — |

Fig. 6.

TEST COVERAGE ANALYZER

FIELD OF THE INVENTION

The present invention relates to computer programming and, in particular, to a technique for testing the operation of a computer program.

BACKGROUND OF THE INVENTION

One of the most challenging tasks in the process of creating a computer program is the step of testing the program to ensure that it is free of errors. Generally, testing a program involves executing the program, and inspecting the program output to ensure that it conforms with the desired or expected output.

It has become common practice to test a program by running it through a test suite in which the program is executed a large number of times, using different input data each time, so that as many of the program options as possible are exercised. A problem that frequently arises during the use of such test suites is that a complex program will often include sections of program code that are rarely executed. For example, a program may include a code section that is designed to handle an error condition that occurs only under unusual circumstances. It is possible that a given test suite will fail to produce such circumstances, and that the code section in question will therefore not be tested.

One possible approach to alleviate this problem would be to design a test coverage program to determine if any lines of a target program (i.e., the program to be tested) have not been executed during a given test suite. By examining the output of such a test coverage program, it would be possible to determine whether the test suite has failed to cause the execution of any code sections. Unfortunately, the only practical method of keeping track of which lines of program code have been executed is to run the target program in "step" mode. In such a mode, each time that a target program instruction is executed, execution is temporarily halted, and control is passed to the test coverage program that records the execution of that particular instruction. Control is then returned to the target program, the target program executes the next instruction, then transfers control back to the test coverage program, etc.

While the single-step process described above can provide the required information concerning which target program instructions have been executed, the process of running the target program in step mode would be very slow. Since a given test suite will often require a large number of executions of the target program with various input data, the total amount of time required to test a program in this manner would be extremely long. For this reason, it would be a significant advantage to provide a test coverage technique that is capable of faster operation.

SUMMARY OF THE INVENTION

The present invention provides a test coverage analyzer, i.e., a computer program, that is capable of monitoring the execution of a target program, to determine which instructions of the target program have been executed by a given test or test suite. The invention performs the test coverage analysis in a much more rapid and efficient manner than prior techniques.

It is assumed that the target program is operable on a computer in either a run mode, in which instructions are executed without interruption, or in a step mode, in which instructions are executed one at a time. Generally, when a given portion of the target program is executed for the first time, it is executed in step mode. While executing the target program in step mode, the test coverage analyzer maintains a table of target program instructions that have been executed. When a branch instruction that transfers control to a first branch path is executed in step mode, the test coverage analyzer inserts one or more breakpoints into the target program such that upon the next execution of the branch instruction, a breakpoint will be encountered at least for the case in which said next execution transfers control to a second branch path different from the first branch path. When an instruction in the table is encountered while executing in step mode, execution of the target program switches to run mode. Run mode in general will continue until one of the inserted breakpoints is encountered. The breakpoint indicates that the target program is about to, or may be about to, take a branch not previously taken, i.e., the target program is beginning to execute code not previously executed. The test coverage analyzer therefore switches back to step mode, preferably removing the breakpoint, and the process continues as described above.

Techniques are also provided for handling indirect jump instructions, such as RETURN instructions, in which the jump target address is variable. For such instructions, the breakpoint is inserted at the jump instruction itself, and is not removed when later encountered. The technique of inserting a breakpoint at the jump instruction may also be used for direct jump instructions having predetermined branch paths, particularly where there are a large number of such branch paths.

BRIEF DESCRIPTION OF THE DRAWINGS

FIG. 5 illustrates the range table maintained by the test coverage analyzer; and FIG. 6 illustrates the breakpoint table maintained by the test coverage analyzer.

DETAILED DESCRIPTION OF THE INVENTION

Figure 1:
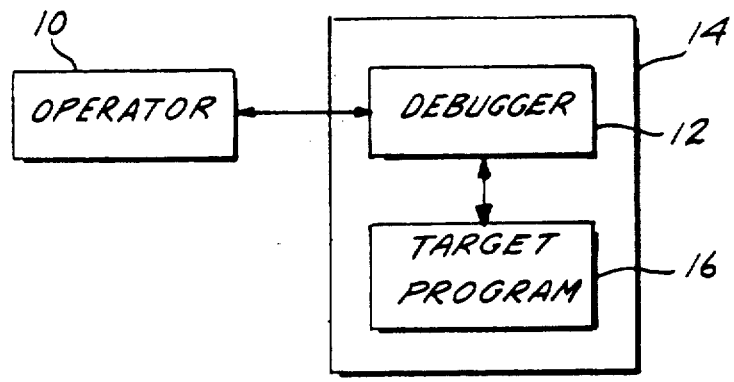
FIG. 1 is a block diagram showing the use of a conventional debugger.

An important feature of the present invention is the use of breakpoints. The concept of a breakpoint can be illustrated with reference to the operation of a conventional debugger. A debugger is a computer program that is used to test and debug a second, target program. Referring to FIG. 1, an operator 10 causes debugger 12 to be loaded into computer 14 and executed. The operator provides the debugger with the name of the target program to be debugged, and the debugger causes target program 16 to also be loaded into the computer and executed. In the arrangement shown in FIG. 1, in which one program (debugger 12) causes the execution of a second program (target program 16), the first program is referred to as the "parent" program, while the second program is referred to as the "child" program.

To assist in the debugging process, operator 10 can instruct debugger 12 to insert breakpoints into target program 16. A breakpoint comprises an instruction that, when executed, halts the execution of the child program, and returns control to the parent program. Debugger 12 inserts a breakpoint in target program 16 by first copying and storing the target program instruction located at the address at which the breakpoint is to be inserted, and then replacing the copied instruction with the breakpoint instruction. The debugger also records the address at which the breakpoint was inserted. Subsequently, whenever the target program attempts to execute the instruction at the breakpoint insertion address, the breakpoint instruction at that address will cause the execution of the target program to be interrupted, and control will be passed back to the debugger. Operator 10 can then cause the debugger to print out the values of program variables, or perform other steps useful for detecting and correcting errors in the target program.

Figure 2:
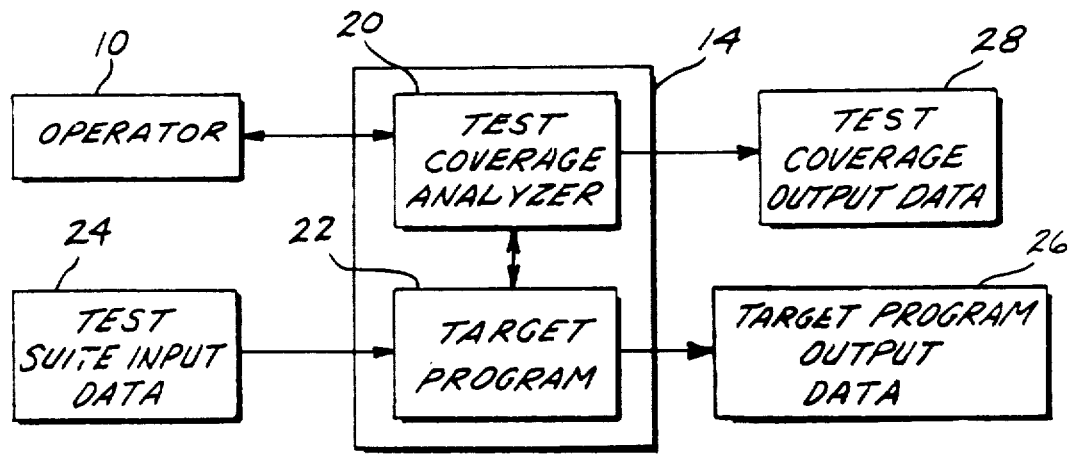
FIG. 2 is a block diagram illustrating the operation of the test coverage analyzer of the present invention.

The overall operation of the test coverage analyzer of the present invention is illustrated in FIG. 2. Operator 10 begins by loading the test coverage analyzer program 20 into computer 14. The operator provides the test coverage analyzer with the name of the target program to be tested. In response, test coverage analyzer 20 loads target program 22 into computer 14, and executes the target program using test suite input data 24 provided by the operator. Execution of the target program results in target program output data 26 that may be reviewed to ensure that the target program has executed properly. In addition, test coverage analyzer 20 produces test coverage output data 28 that identifies any target program instructions that have not been executed by the test suite. If any such instructions exist, then the above process may be repeated using test suite input data that has been redesigned to ensure that the omitted target program instructions are executed.

Figure 3:
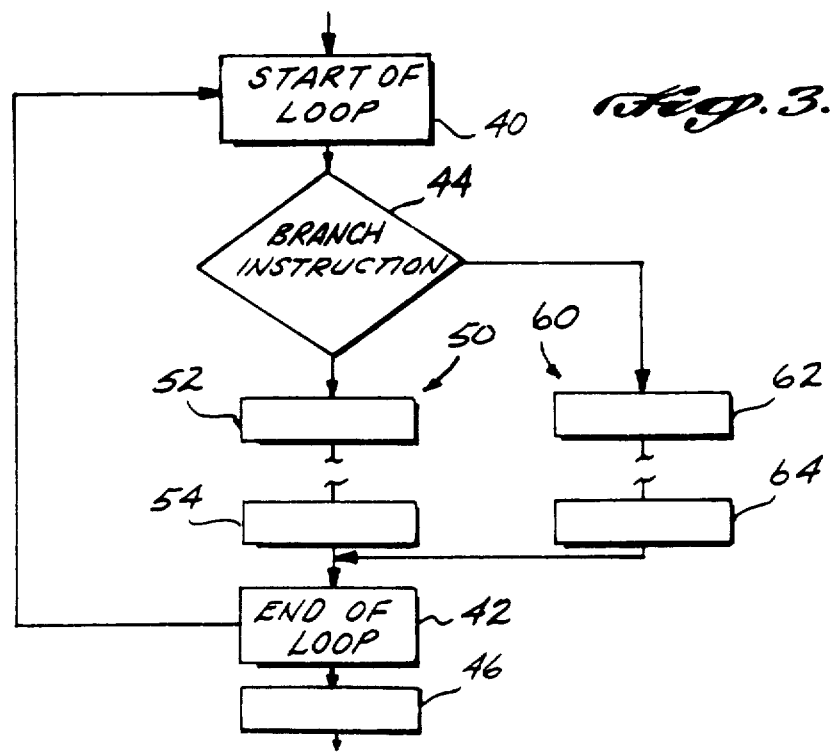
FIG. 3 is a partial flow chart of the target program.

A basic concept of the present invention can be explained with reference to FIG. 3. FIG. 3 illustrates a portion of a target program that is to be tested by the test coverage analyzer of the present invention. For the purpose of this example, it is assumed that the target program includes a loop that extends from instruction 40 to instruction 42, and that the loop is executed multiple times each time the program is executed. The loop includes branch instruction 44 that can direct the program flow through a main branch 50 that includes instructions 52 and 54, or through a second branch 60 that includes instructions 62 and 64. Generally, a branch instruction is an instruction that can transfer control to one of two or more other instructions, depending upon some condition testable by the program. In the present example, it is assumed that the selection of first branch 50 or second branch 60 is made depending upon the value of one or more program parameters that can change each time the loop is executed. It will also be assumed that branch 50 is the branch that is normally executed, and that branch 60 is executed only in unusual circumstances.

The sequence of operations used by the present invention to test the program section shown in FIG. 3 is as follows. The test coverage analyzer commences execution of the target program in step mode, keeping track of which instructions have been executed. Thus the first time that the program segment shown in FIG. 3 is executed, the computer will execute instructions 40, 44, 52, 54, and 42 in step mode, and the test coverage analyzer will record the instructions so executed. However, when branch instruction 44 is executed during this first pass through the loop, the test coverage analyzer will determine that this instruction is a branch instruction, and will therefore insert a breakpoint into the target program at instruction 62, i.e., at the first instruction of the branch path not taken during this first pass. Instruction 42 is also a branch instruction, because it can transfer control to instruction 40 or to subsequent instruction 46. Therefore, when instruction 42 is executed for the first time, a breakpoint will also be set at instruction 46, i.e., at the first instruction of the branch not taken. The target program flow will return to instruction 40 to begin a second pass through the loop.

When the test coverage analyzer encounters instruction 40 at the beginning of the second pass, it will recognize that instruction 40 has already been executed, and will thereby switch from step mode to the normal run mode. Thus in subsequent passes through the loop, assuming that branch 50 rather than branch 60 continues to be executed, and assuming that the program does not exit the loop, the target program will execute at the normal run speed of the computer, rather than at the much slower speed required by step mode.

Should the target program continue to execute only branch 50, and then exit the loop, the breakpoint at instruction 46 will be encountered. The test coverage analyzer will remove the breakpoint and switch back to step mode, to continue its step by step analysis of target program instructions that have been executed. When target program execution terminates, the test coverage analyzer will produce output data indicating that instructions 62 and 64 have never been executed. The operator can then redesign the test suite in an effort to cause execution of these instructions. On the other hand, should the computer attempt to execute branch 60 of the target program during one of the passes through the loop, it will encounter the breakpoint inserted in place of instruction 62. Encountering the breakpoint will cause return of control to the test coverage program. In response, the test coverage program will revert to step mode, and will remove the breakpoint by restoring the original instruction 62. The test coverage analyzer will then continue to single-step through branch 60, recording the execution of instructions 62 and 64. When program flow then returns to instruction 42, the test coverage analyzer will detect the fact that instruction 42 has already been executed, and will switch back to normal run mode. Subsequent passes through branch 60 will occur at normal run speed, because the breakpoint at the address of instruction 62 has now been removed.

In a brute force approach to test coverage analysis, the execution of the target program would be carried out entirely in step mode. By contrast, using the present invention, a given section of code will be executed in step mode the first time that the code section is run, but will thereafter be executed in run mode. Thus, if a program contains code sections, such as branch 50 in FIG. 3, that are executed many times during each program execution, a substantial time savings will be realized by the present invention, as compared to the brute force technique.

The operations described above can be summarized in the following steps:

1. A previously unexecuted portion of the target program is executed in step mode.

2. In step mode, when a branch instruction is encountered, a breakpoint is inserted in place of the first instruction of each branch path not taken.

3. In step mode, when an instruction that has already been executed is encountered, the test coverage analyzer switches to run mode.

4. When a breakpoint is encountered, the test coverage analyzer switches to step mode, preferably removing the breakpoint.

As a result of this technique, for any given code section, the instructions of that section are executed once in step mode the first time that that section is executed, and are executed in run mode thereafter. The greater the number of times that a code section is executed during a given execution of the program, the greater the time savings produced by the invention. It should be understood that the term "instruction", as used herein, includes both native machine instructions, for programs that have been complied, as well as instructions in a programming language for programs that will be executed via an interpreter.

Figure 4A:
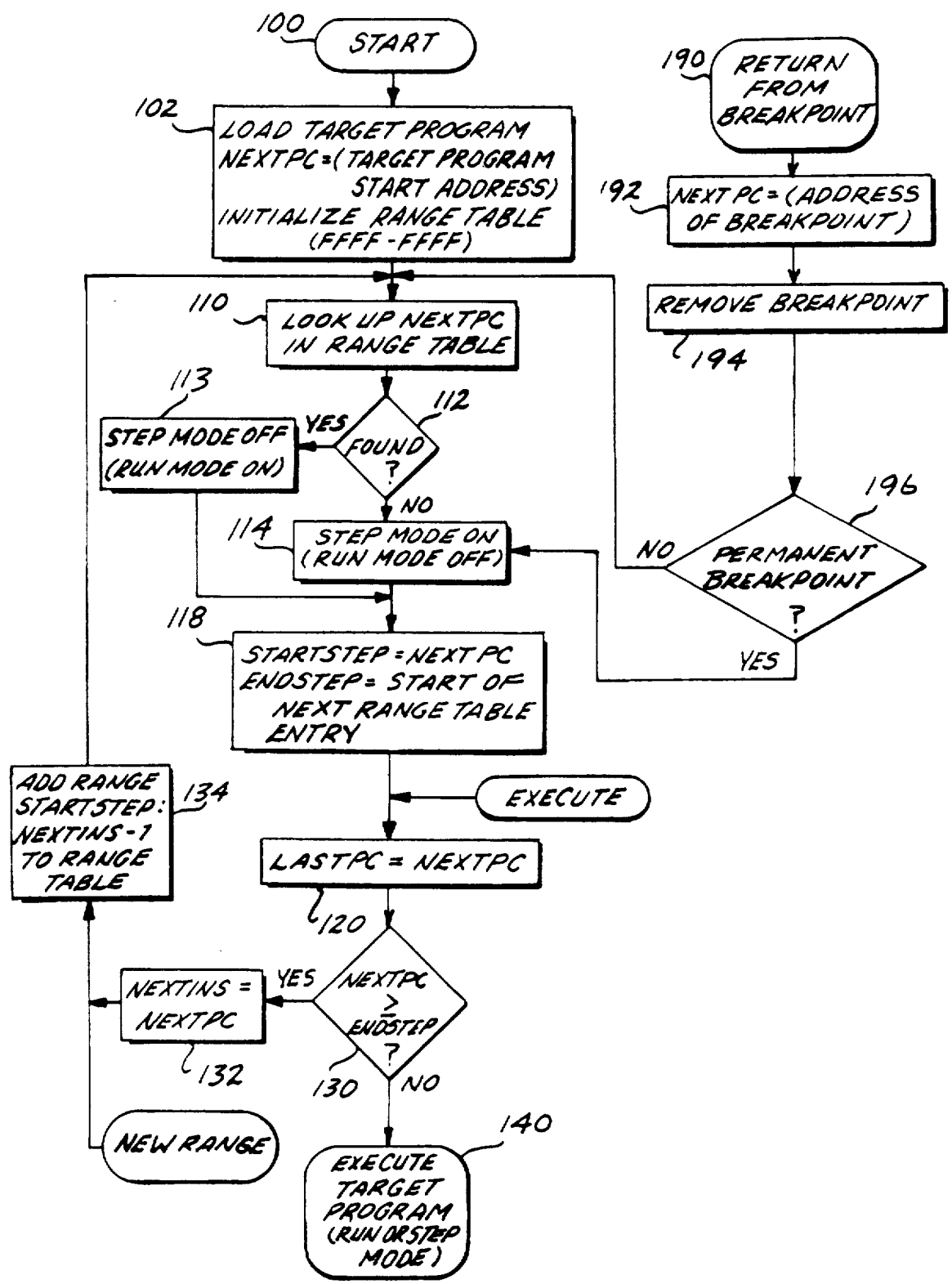
FIGS. 4A and 4B comprise a flow chart of a preferred embodiment of the test coverage analyzer.
Figure 4B:
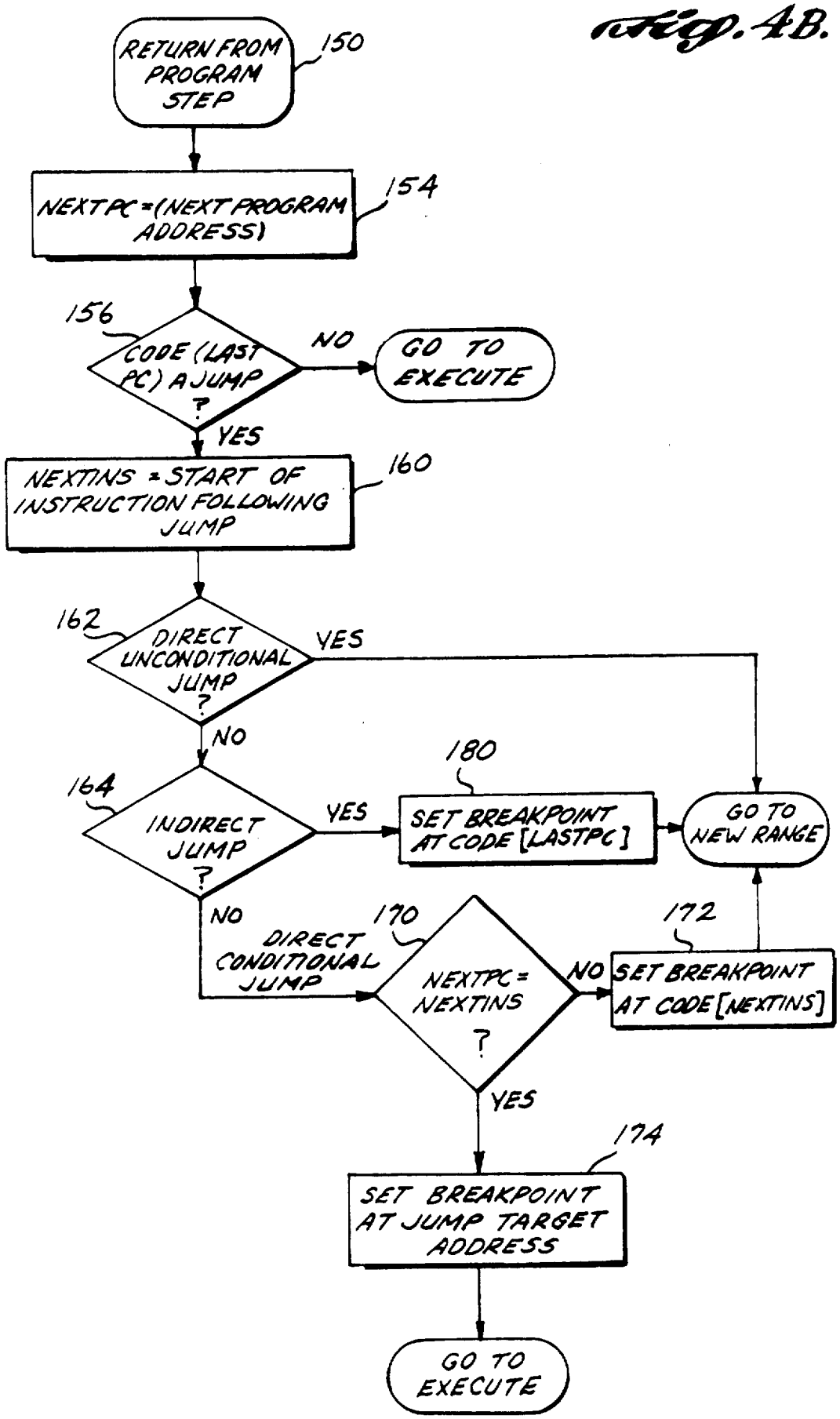

A more detailed illustration of a preferred embodiment of the invention is set forth in FIGS. 4-6. FIGS. 4A and 4B comprise a flow chart of the test coverage analyzer, while FIGS. 5 and 6 depict two data tables created and maintained by the test coverage analyzer. FIG. 5 depicts a range table that is used by the test coverage analyzer to keep track of instructions that have already been executed. Each record (i.e., row) in the range table designates the start and end addresses (or the start address and length) of an already executed range of instructions. FIG. 6 depicts a breakpoint table that is used by the test coverage analyzer to record breakpoints that have been inserted into the target program. Each breakpoint table record indicates the address at which a breakpoint has been inserted, the original instruction at that address, and a flag further described below. It will be understood by those skilled in the art that the range and breakpoint tables can have any arrangement or format, so long as they contain data from which the already executed instructions and the breakpoints can be determined.

Referring initially to FIG. 4A, execution of the test coverage analyzer begins at entry point 100. In block 102, the test coverage analyzer loads the target program, and initializes the variable NEXTPC to the entry point or starting address of the target program. This parameter will be used to keep track of the address of the next target program instruction to be executed. Block 102 also initializes the range table by adding a table entry for which the start of range and end of range addresses are set to values higher than any instruction address in the target program, e.g., FFFF (hexadecimal).

After the initialization step, the test coverage analyzer proceeds in block 110 to look up NEXTPC in the range table. If this address is in the range table, i.e., if NEXTPC is within any of the start-end ranges contained in the table, then the instruction at address NEXTPC has already been executed. Blocks 112-114 therefore cause step mode to be turned off. However, if NEXTPC is not in the range table, then the instruction at that address has not been executed, and step mode is turned on. Assuming that the test coverage analyzer has just begun operation and that the NEXTPC address is not in the range table, step mode will be turned on. Block 118 then sets the STARTSTEP and ENDSTEP parameters. STARTSTEP is set equal to NEXTPC, i.e., the address of the next target program instruction to be executed, while ENDSTEP is initialized to the start of the "next" range table entry. Thus, during the initial pass through block 118, ENDSTEP will be initialized to a value such as FFFF. Block 120 then sets the parameter LASTPC equal to NEXTPC. LASTPC is used to designate the address of the last executed target program instruction.

In block 130, the test coverage analyzer determines whether the parameter NEXTPC is greater than or equal to ENDSTEP. Generally, this test determines whether or not execution of the target program has encountered a new range that has already been executed. Initially, NEXTPC will be less than ENDSTEP, and the test coverage analyzer will then proceed in block 140 to transfer control to the target program. This control transfer takes places regardless of whether or not step mode has been turned on. When NEXTPC is greater than or equal to ENDSTEP, i.e., when an already executed range has been reached, then blocks 132 and 134 are executed, as further described below.

Referring now to FIG. 4B, when the target program passes control back to the test coverage analyzer while step mode is on, i.e., after a single target program instruction has been executed, the test coverage analyzer resumes operation at entry point 150. (Return from a breakpoint in the target program is discussed below.) In block 154, the test coverage analyzer resets the value of NEXTPC equal to the address of the next target program instruction to be executed. For example, if the target program instruction at address LASTPC does not transfer control, then NEXTPC will simply be the next sequential address. If the instruction at address LASTPC is a jump, then NEXTPC will be equal to the jump target address, i.e., the address of the instruction to which the jump will transfer control. In general, as used herein, the term "jump" refers to any instruction capable of altering the sequential execution of instructions. Thus all branch instructions are jump instructions, but the reverse is not true, i.e., some jump instructions (e.g., GOTO instructions) are jumps but not branches.

If the instruction at address LASTPC is not a jump, then block 156 transfers control back to block 120 in FIG. 4A, to repeat the steps just described. Thus, at the beginning of execution of the test coverage analyzer, before any entries (aside from initialization) have been placed in the range table, the test coverage analyzer will continue to loop through instructions 120, 130, 140, 150, 154, and 156 until a jump is detected.

When block 156 determines that a jump has been encountered, block 160 sets the parameter NEXTINS equal to the address of the start of the instruction immediately following the jump, i.e., the address to which control will be passed if the jump is not taken. Blocks 162 and 164 then further analyze the target program instruction at address LASTPC to determine the type of jump. If the jump is a direct unconditional jump, e.g., the equivalent of a GOTO instruction, then control is passed to block 134 shown in FIG. 4A. Block 134 adds the range STARTSTEP: NEXTINS−1 to the range table. STARTSTEP was previously initialized in block 118 so that it was equal to the first target program instruction executed, while NEXTINS−1 is the address of the end of the jump instruction. Control is then returned to block 110. In block 110, the test coverage analyzer looks up address NEXTPC in the range table. Recall that NEXTPC was last set in block 154 to be equal to the next target program instruction to be executed, in this case, the jump target address to which control was passed by the direct unconditional jump. If NEXTPC is not in the range table, i.e., if the instruction at the jump target address has not yet been executed, then the program remains in step mode. The above-described process is then repeated as the target program executes the instructions in a new range.

Imagine now that the target program, still being executed in step mode, encounters a direct conditional jump instruction, e.g., the equivalent of an IF statement. A direct conditional jump instruction is one example of a branch instruction. In this case, blocks 162 and 164 transfer control to block 170, and block 170 determines whether or not the jump was taken by comparing the parameters NEXTPC and NEXTINS. NEXTPC is the address of the next target program instruction that will be executed, while NEXTINS is equal to the address of the target program instruction immediately following the direct conditional jump instruction. If these parameters are not equal, then the jump was taken, and the test coverage analyzer proceeds in block 172 to insert a breakpoint into the target program at NEXTINS, i.e., at the address of the first instruction of the branch path not taken. A corresponding entry is made to the breakpoint table (FIG. 6). For this entry, the flag in the breakpoint table is set to a value indicating that this breakpoint is "temporary". The term "temporary" refers to the fact that this breakpoint will be removed from the target program if it is later encountered, as further described below. Control is then returned to block 134 in FIG. 4A. Thus in this case, the test coverage analyzer has proceeded in a manner identical to the case of a direct unconditional jump, except that a breakpoint was inserted at the address of the instruction immediately following the jump instruction. If the jump is not taken during a subsequent execution of this jump instruction, then the program will encounter this breakpoint.

If block 170 determines that the jump was not taken, then block 174 inserts a breakpoint into the target program at the jump target address, i.e., at the address to which control would have been passed had the jump been taken. A corresponding entry is made in the breakpoint table, with the flag again indicating that the breakpoint is temporary. Thus the net effect of blocks 170, 172, and 174 is to insert a temporary breakpoint at the first instruction of the branch path not taken. However when no jump is taken, the sequential execution of instructions has not been altered, and the test coverage analyzer therefore returns to block 120 in FIG. 4A, just as if block 156 had determined that the just-executed target program instruction was not a jump instruction.

A second type of branch instruction is an indirect jump. An example of an indirect jump is a RETURN statement of the type that transfers control from a subprogram or procedure back to a calling program. Such a statement transfers control back to the instruction immediately following the CALL statement. This jump is "indirect", because the subprogram can be called from many different points in the main program, and thus the target of the RETURN, i.e., the jump target address, is variable. Thus for an indirect jump, it will generally be impractical to insert breakpoints at each branch path not taken, because there will be an essentially indeterminate number of potential branch paths. Therefore, when block 164 in FIG. 4B determines that an indirect jump instruction has been encountered, it transfers control to block 180, and block 180 causes the insertion of a breakpoint into the target program at address LASTPC, i.e., at the address of the RETURN or other indirect jump statement itself. Control then returns to block 134. When block 180 inserts the breakpoint at LASTPC, it also makes a corresponding entry in the breakpoint table, and sets the flag to indicate that this breakpoint is "permanent". This breakpoint is permanent because it will effectively always remain in the target program, as further described below.

In summary, FIG. 4B illustrates two different techniques for use with two different kinds of jumps. For a direct conditional jump, i.e., a jump that can transfer control to one of two or more predetermined instructions, temporary breakpoints are inserted in each of the branch paths that are not taken. However, for an indirect jump, a permanent breakpoint is inserted at the indirect jump instruction itself. The test coverage analyzer could use the indirect jump technique for some or all direct conditional jumps, i.e., the test coverage analyzer could insert permanent breakpoints at each conditional jump instruction. However, the illustrated technique for handling conditional jumps is more efficient, because upon subsequent re-execution of the jump instruction, the program does not encounter a breakpoint as long as the conditional jump instruction keeps transferring control to the same branch path. The technique of inserting breakpoints at each branch not taken is not practical for indirect jump instructions, because there are an essentially unlimited number of target instructions to which such a jump could transfer control. Thus, the breakpoint is placed at the indirect jump instruction itself. It may also be the case that for direct conditional jumps having a large number of possible branch paths, it may be more efficient to insert a single breakpoint at the jump instruction, rather than a breakpoint in each branch path not taken. Thus, for example, one could insert a breakpoint at the jump instruction for direct conditional jumps having more than a predetermined number of possible branch paths.

The techniques described above can be summarized by stating that when a branch instruction that transfers control to a first branch path is executed in step mode, the test coverage analyzer inserts one or more breakpoints into the target program. The breakpoints are inserted such that, upon the next execution of the branch instruction, a breakpoint will be encountered at least for the case in which the next execution transfers control to a second branch path different from the first branch path.

Imagine now that the target program (in step mode) encounters an instruction that has already been executed, i.e., that is already in the range table. Blocks 112-114 in FIG. 4A will therefore switch to run mode. Thus when control is subsequently passed to the target program in block 140, the target program will commence executing at normal run speed. This execution will continue until a breakpoint is encountered, at which point control will be passed back to the test coverage analyzer at entry point 190. In block 192, the test coverage analyzer will reset the variable NEXTPC equal to the address of the breakpoint, and block 194 then removes the breakpoint from the target program and from the breakpoint table. Block 196 then determines whether the breakpoint was permanent or temporary, and transfers control to block 114 or block 110, respectively. Thus for a permanent breakpoint, target program execution recommences at block 140 in step mode, and the test coverage analyzer therefore immediately encounters the indirect jump at the address from which the breakpoint was just removed. As a result, the breakpoint is immediately replaced. On the other hand, when block 196 determines that the breakpoint was temporary, execution recommences at block 110, and blocks 112-114 set either step or run mode, depending upon whether the address NEXTPC is in the range table.

When execution of the target program terminates, the target program executes the operating system's terminate function. The operating system then informs the parent process, i.e., the test coverage analyzer, that the child process has terminated. At this point, the test coverage analyzer can analyze the range table, and produce a display or printed report indicating any lines of code that were not executed. Preferably, this is done by converting the raw addresses in the range table to source code line numbers. The test coverage analyzer could also write the range and breakpoint tables to disk, for analysis by a separate report program, or for re-execution of the test coverage analyzer, as described below.

The test coverage analyzer described above can be enhanced by permitting the test coverage analyzer to utilize the results (range and breakpoint tables) of prior executions of the same target program. For example, assume that the test coverage analyzer writes the range and breakpoint tables to disk after each termination of the target program. Then in block 102, when the test coverage analyzer begins a subsequent run with the same target program, the test coverage analyzer can be directed by an operator to utilize the results of a prior execution. Thus instead of initializing the range table, the test coverage analyzer would load the range and breakpoint tables created during a prior execution, or other range and breakpoint tables indicated by the operator. The test coverage analyzer then inserts the breakpoints listed in the breakpoint table into the target program, and proceeds to blocks 110-114. In such an embodiment, if the target program start address was in the range table, then target program execution would commence in run mode, rather than in step mode. This approach will in general permit subsequent executions of the target program to take place at higher speed, because a larger fraction of the target program will be executed in run mode. It is typical of a test suite to run a target program many times. The described enhancement allows the test coverage analyzer to accumulate the effects of the entire test suite.

Another enhancement is to permit an operator to create initial breakpoint and range tables according to the operator's wishes. This allows the operator to specify what portions of the code really need to be analyzed. For example, a portion of program code provided by an outside supplier without source code, such as a compiler library routine, would typically not need to be analyzed. A suitable input processor could then create range tables that show the ranges occupied by such code as already tested, and add breakpoints to the start locations of the code to be analyzed. This technique can speed program execution, as well as reducing memory requirements by reducing table size.

Another enhancement to the system described above is to add flag bits to each range of the range table. One value of the flag could simply indicate a range that has already been executed, as described above. Other flag values could indicate other attributes, as desired. For example, one flag value could indicate whether or not a permanent breakpoint will be set within a given range on RETURN instructions. By eliminating such permanent breakpoints, execution of some programs will speed up considerably. To keep tracking program flow in such circumstances, a breakpoint may be set after each subroutine CALL instead. However, the potential disadvantage of this approach is that RETURN instructions are not always used only to return to the instruction following a subroutine CALL instruction.

The technique for causing execution of the target program in step mode will vary depending upon the particular computer used. For example, some microprocessors, including the Intel 8086 family of microprocessors, include a hardware single step capability. If the microprocessor does not include this capability, the hardware step mode can be simulated by using breakpoints. This is done by analyzing the instruction about to be executed to determine how long the instruction is, and if it transfers control flow. A breakpoint is then set at the next instruction following the one to be stepped, or at the jump address if the instruction transfers control, or at both if it is a conditional jump. When the program is then run, only one instruction will be executed before a breakpoint is encountered. The single step breakpoints are then removed before repeating this process for the next program step.

While the preferred embodiments of the invention have been described, variations will be apparent to those skilled in the art. Accordingly, the scope of the invention is to be determined by reference to the following claims.

The embodiments of the invention in which an exclusive property or privilege is claimed are defined as follows:

1. A method for monitoring the execution of a target program comprising a series of instructions to determine which instructions have been executed, the target program being executable on a computer in a run mode in which instructions are executed without interruption, and in a step mode in which instructions are executed one at a time, the method comprising the computer performed steps of:

executing a portion of the target program in step mode;

while executing the target program in step mode, maintaining a table of target program instructions that have been executed;

when a branch instruction that transfers control to a first branch path is executed in step mode, inserting one or more breakpoints into the target program such that upon the next execution of the branch instruction, a breakpoint will be encountered at least for the case in which said next execution transfers control to a second branch path different from the first branch path;

switching to run mode when an instruction in said table is encountered while executing in step mode; and switching to step mode when a breakpoint is encountered while executing in run mode.

2. The method of claim 1, comprising the further step of maintaining a breakpoint table indicating breakpoints that have been inserted into the target program.

3. The method of claim 1, comprising the further step of inserting one or more breakpoints into the target program prior to the commencement of execution of the target program.

4. The method of claim 1, wherein the step of maintaining a table indicating which instructions have been executed comprises maintaining a range table comprising one or more range records, each range record indicating a range of one or more instructions that have been executed.

5. The method of claim 4, comprising the further step of creating one or more range records prior to execution of the target program.

6. The method of claim 1, wherein when the branch instruction is capable of transferring control to one of two or more predetermined branch paths, the inserting step comprises inserting breakpoints in each branch path other than the first branch path.

7. The method of claim 6, wherein each branch path includes a first instruction, and wherein the breakpoints are inserted at the first instruction of each branch path other than the first branch path.

8. The method of claim 6, comprising the further step of removing a breakpoint when the breakpoint is encountered.

9. The method of claim 6, wherein when the branch instruction comprises an indirect jump instruction that transfers control to a variable target program address, the inserting step comprises inserting the breakpoint at the indirect jump instruction.

10. The method of claim 9, comprising the further step of, when a breakpoint is encountered, removing the breakpoint if the breakpoint was inserted in a predetermined branch path, but not removing the breakpoint if the breakpoint was inserted at an indirect jump instruction.

11. The method of claim 10, comprising the further step of maintaining a breakpoint table indicating each inserted breakpoint and, for each breakpoint, further indicating whether the breakpoint was inserted in a predetermined branch path or at an indirect jump instruction.

12. The method of claim 1, wherein the inserting step comprises inserting the breakpoint at the branch instruction.

13. The method of claim 12, wherein the breakpoint is inserted at the branch instruction when the branch instruction is an indirect jump that transfers control to a variable target program address.

14. The method of claim 13, comprising the further step of maintaining a breakpoint table indicating each inserted breakpoint and, for each breakpoint, further indicating that the breakpoint was inserted at an indirect jump instruction.

15. The method of claim 1, wherein when the branch instruction is capable of transferring control to one of two or more predetermined branch paths, the inserting step comprises inserting breakpoints either in each branch path other than the first branch path, or at the branch instruction, depending upon the number of said predetermined branch paths.

16. The method of claim 15, comprising the further step of, when a breakpoint is encountered, removing the breakpoint if the breakpoint was inserted in a branch path, but not removing the breakpoint if the breakpoint was inserted at a branch instruction.

17. An apparatus for monitoring the execution of a target program comprising a series of instructions to determine which instructions have been executed, the target program being executable on a computer in a run mode in which instructions are executed without interruption, and in a step mode in which instructions are executed one at a time, the apparatus comprising:

means for executing a portion of the target program in step mode;

means operable while executing the target program in step mode for maintaining a table of target program instructions that have been executed;

means operable when a branch instruction that transfers control to a first branch path is executed in step mode for inserting one or more breakpoints into the target program such that upon the next execution of the branch instruction, a breakpoint will be encountered at least for the case in which said next execution transfers control to a second branch path different from the first branch path;

means for switching to run mode when an instruction in said table is encountered while executing in step mode; and means for switching to step mode when a breakpoint is encountered while executing in run mode.

18. The apparatus of claim 17, wherein when the branch instruction is capable of transferring control to one of two or more predetermined branch paths, the means for inserting comprises means for inserting breakpoints in each branch path other than the first branch path.

19. The apparatus of claim 17, wherein the means for inserting comprises means for inserting the breakpoint at the branch instruction.

* * * * *